(12) United States Patent
King et al.

(10) Patent No.: US 6,199,770 B1
(45) Date of Patent: Mar. 13, 2001

(54) PEST EXTERMINATION SYSTEM

(76) Inventors: Charles W. King, 333 6th St. SE., Arab, AL (US) 35016; Jimmy D. Harper, 487 County Rd. #41, Section, AL (US) 35771

( * ) Notice: Subject to any disclaimer, the term of this patent is extended or adjusted under 35 U.S.C. 154(b) by 0 days.

(21) Appl. No.: 09/321,164

(22) Filed: May 27, 1999

(51) Int. Cl.$^7$ ........................................ B05B 15/10
(52) U.S. Cl. .................. 239/208; 239/209; 169/16; 43/124; 43/132.1; 248/62; 248/65
(58) Field of Search .................... 239/208, 209; 43/124, 132.1; 248/62, 65, 74.1; 169/16, 13

(56) References Cited

U.S. PATENT DOCUMENTS

| | | | |
|---|---|---|---|
| 2,981,025 | * 4/1961 | Woodson | 43/124 |
| 3,203,653 | * 8/1965 | Hall | 248/62 |
| 3,676,949 | * 7/1972 | Ramsey | 43/124 |
| 3,782,026 | * 1/1974 | Bridges et al. | 43/124 |
| 4,407,478 | * 10/1983 | Hodges | 248/62 |
| 4,742,641 | * 5/1988 | Cretti | 43/132.1 |
| 5,317,831 | * 6/1994 | Fletscher | 43/124 |
| 5,881,494 | * 3/1999 | Jenkins | 43/124 |

* cited by examiner

Primary Examiner—Patrick Brinson
Assistant Examiner—Dinh Q. Nguyen

(57) ABSTRACT

A pest extermination system for installation in a structure for distributing pesticide and insecticide. The pest extermination system includes a piping system. The piping system has a plurality of nozzles positioned therealong that are adapted for spraying a pesticide. A pumping device is in fluid communication with the piping system and is adapted for pumping pesticide into the piping system.

2 Claims, 2 Drawing Sheets

PEST EXTERMINATION SYSTEM

BACKGROUND OF THE INVENTION

1. Field of the Invention

The present invention relates to extermination systems and more particularly pertains to a new pest extermination system for installation in a structure for distributing pesticide and insecticide.

2. Description of the Prior Art

The use of extermination systems is known in the prior art. More specifically, extermination systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,742,641; U.S. Pat. No. 3,676,949; U.S. Pat. No. 1,795,488; U.S. Pat. No. 4,945,673; U.S. Pat. No. 3,330,062; and U.S. Pat. No. 5,394,642.

While these devices fulfill their respective, particular objectives and requirements, the aforementioned patents do not disclose a new pest extermination system. The inventive device includes a piping system. The piping system has a plurality of nozzles positioned therealong that are adapted for spraying a pesticide. A pumping device is in fluid communication with the piping system and is adapted for pumping pesticide into the piping system.

In these respects, the pest extermination system according to the present invention substantially departs from the conventional concepts and designs of the prior art, and in so doing provides an apparatus primarily developed for the purpose of installation in a structure for distributing pesticide and insecticide.

SUMMARY OF THE INVENTION

In view of the foregoing disadvantages inherent in the known types of extermination systems now present in the prior art, the present invention provides a new pest extermination system construction wherein the same can be utilized for installation in a structure for distributing pesticide and insecticide.

The general purpose of the present invention, which will be described subsequently in greater detail, is to provide a new pest extermination system apparatus and method which has many of the advantages of the extermination systems mentioned heretofore and many novel features that result in a new pest extermination system which is not anticipated, rendered obvious, suggested, or even implied by any of the prior art extermination systems, either alone or in any combination thereof.

To attain this, the present invention generally comprises a piping system. The piping system has a plurality of nozzles positioned therealong that are adapted for spraying a pesticide. A pumping device is in fluid communication with the piping system and is adapted for pumping pesticide into the piping system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pest extermination system apparatus and method which has many of the advantages of the extermination systems mentioned heretofore and many novel features that result in a new pest extermination system which is not anticipated, rendered obvious, suggested, or even implied by any of the prior art extermination systems, either alone or in any combination thereof.

It is another object of the present invention to provide a new pest extermination system which may be easily and efficiently manufactured and marketed.

It is a further object of the present invention to provide a new pest extermination system which is of a durable and reliable construction.

An even further object of the present invention is to provide a new pest extermination system which is susceptible of a low cost of manufacture with regard to both materials and labor, and which accordingly is then susceptible of low prices of sale to the consuming public, thereby making such pest extermination system economically available to the buying public.

Still yet another object of the present invention is to provide a new pest extermination system which provides in the apparatuses and methods of the prior art some of the advantages thereof, while simultaneously overcoming some of the disadvantages normally associated therewith.

Still another object of the present invention is to provide a new pest extermination system for installation in a structure for distributing pesticide and insecticide.

Yet another object of the present invention is to provide a new pest extermination system which includes a piping system. The piping system has a plurality of nozzles positioned therealong that are adapted for spraying a pesticide. A pumping device is in fluid communication with the piping system and is adapted for pumping pesticide into the piping system.

Still yet another object of the present invention is to provide a new pest extermination system that prevents insect infestation and damage to a structure.

Even still another object of the present invention is to provide a new pest extermination system that permits a user to exterminate pests himself or herself.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
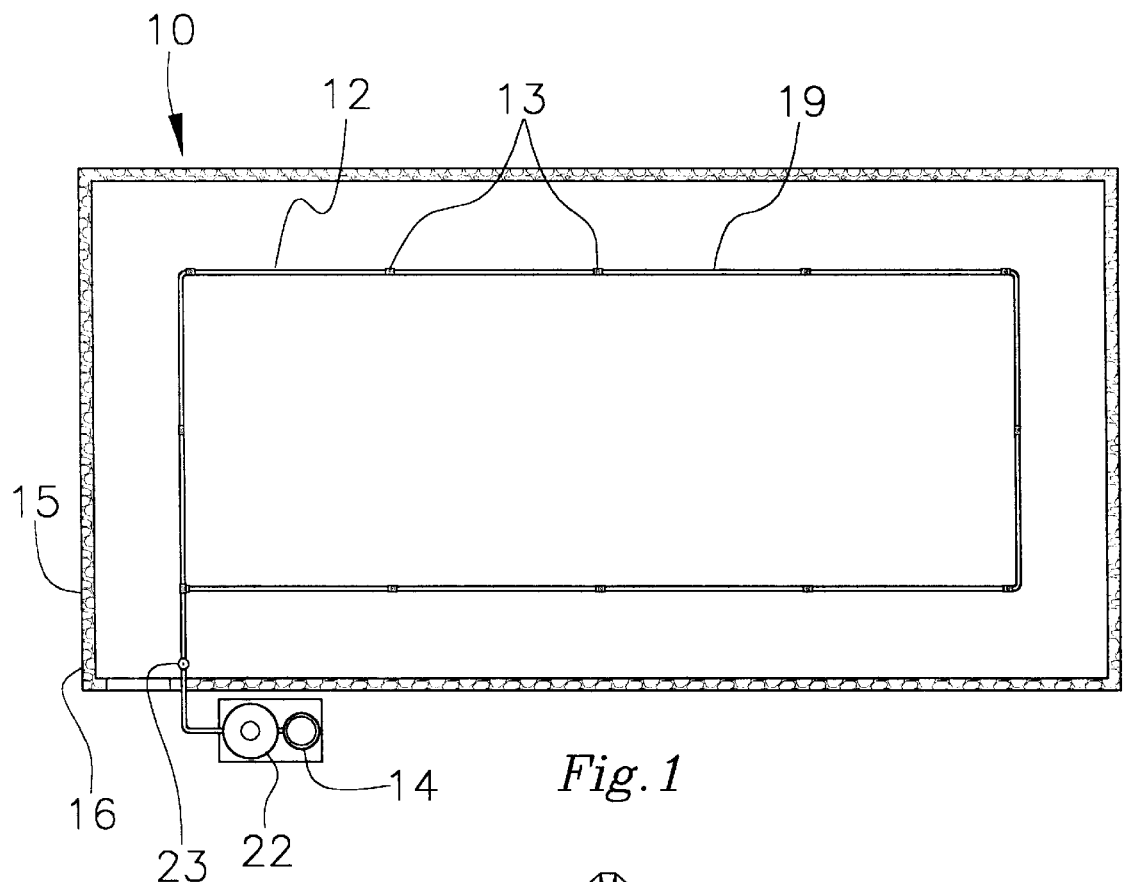
FIG. 1 is a schematic side view of a new pest extermination system according to the present invention.
Figure 2:
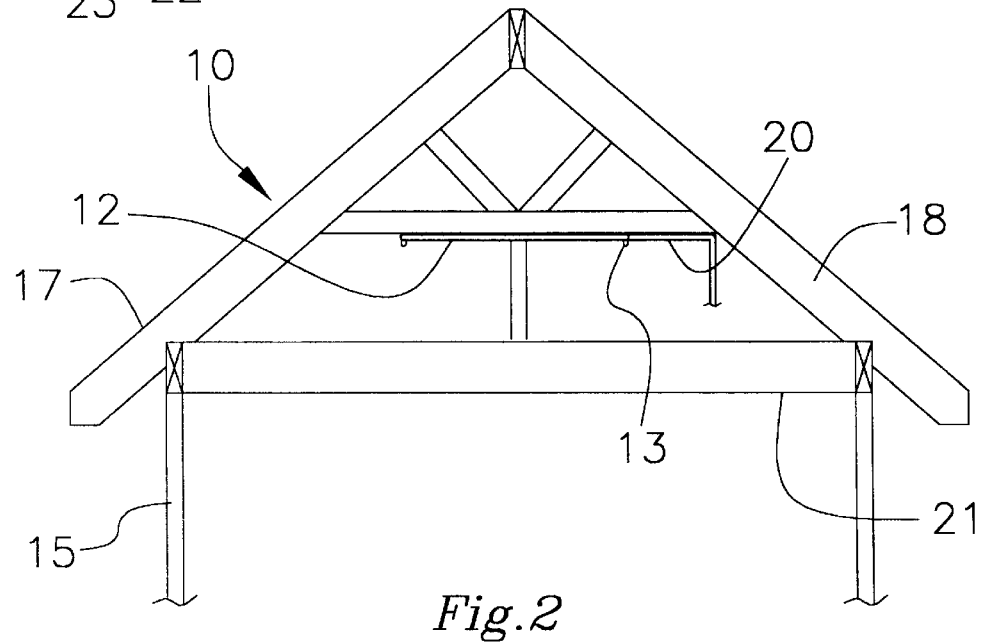
FIG. 2 is a schematic side view of the present invention.
Figure 3:
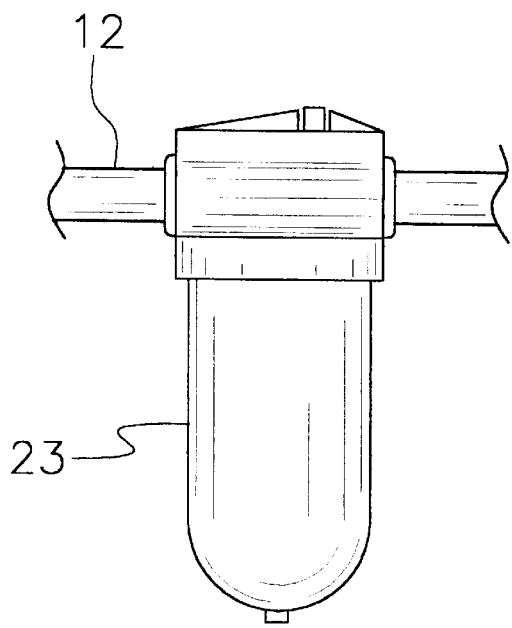
FIG. 3 is a schematic side view of a filter of the present invention.
Figure 4:
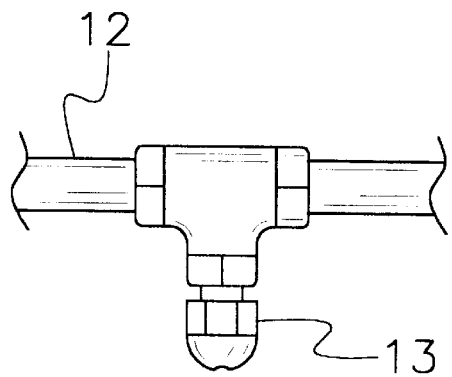
FIG. 4 is a schematic side view of a nozzle of the present invention.
Figure 5:
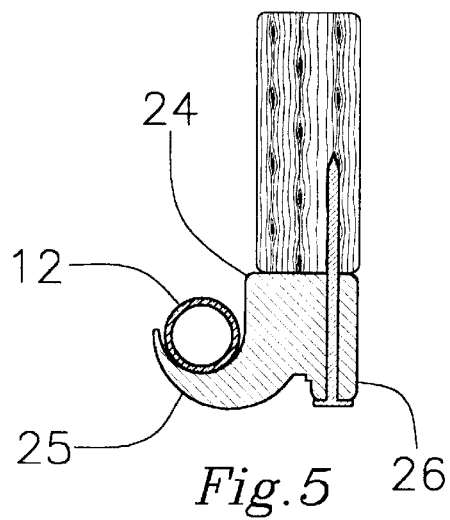
FIG. 5 is a schematic cross sectional view of a hook of the present invention.
Figure 6:
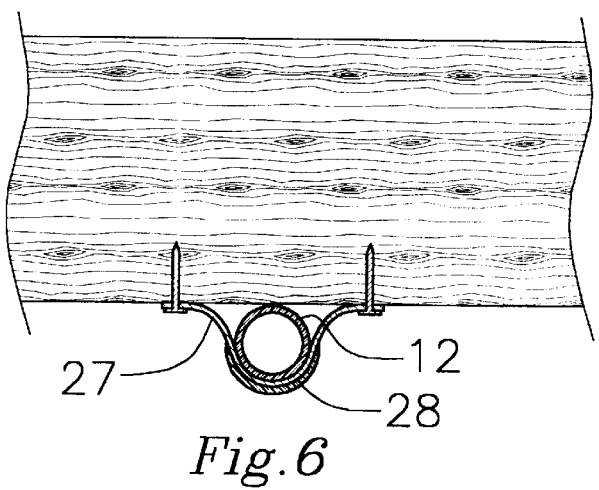
FIG. 6 is a schematic cross sectional view of a clamp of the present invention.

With reference now to the drawings, and in particular to FIGS. 1 through 6 thereof, a new pest extermination system embodying the principles and concepts of the present invention and generally designated by the reference numeral 10 will be described.

As best illustrated in FIGS. 1 through 6, the pest extermination system 10 generally comprises a piping system 12. The piping system has a plurality of nozzles 13 positioned therealong that are adapted for spraying a pesticide. A pumping device 14 is in fluid communication with the piping system and is adapted for pumping pesticide into the piping system.

The piping system is adapted for mounting in a structure 15 with a base 16 including four walls and a roof 17 that has a pair of roofing portions 18 oriented at acute angles to a ceiling of the structure. The roof could also be flat with side walls.

Preferably, an annular lower piping system 19 is positioned inwardly of the base. An annular upper piping system 20 is positioned inwardly of the roofing portions and above the ceiling 21.

The nozzles should be positioned between about 5 and 8 feet apart. The pumping device preferably comprises an air compressor that blows a mixture of air and pesticide through the piping system and out of the nozzles in a "fog." The fog provides much better coverage than would a direct mist of liquid in that the fog will spread out throughout the crawlspace below the structure and the attic between the ceiling and roof of the structure.

The outer diameter of the pipes of the piping system should be about 1½ inch to transport the fog.

Preferably, a reservoir 22 is in fluid communication with the piping systems and adapted for storing pesticide. The reservoir should be positioned downwardly of the pumping device.

Also preferably, a filter 23 filters the pesticide so that debris carried by the pesticide and sucked in by the air compressor wont clog up the nozzles. Any suitable filter may be used, including a membrane filter.

Preferably, a plurality of hooks 24 are provided. Each of the hooks is adapted for coupling a portion of the piping system to a cross member of the structure extending generally parallel the portion of the piping system. Ideally, each of the hooks has an arcuate flange 25 extending outwardly therefrom for positioning the associated portion of the piping system alongside and below the associated cross member. The flange should taper together towards its outer tip for safety so that a user crawling through the crawlspace below the floor of the structure or in the attic wont be injured by the flange. Each of the hooks should also have a protrusion 26 extending outwardly along a longitudinal axis of the mounting hole through which a fastener extends. This permits easier insertion of the fastener into the hole, especially when a nail is used as the fastener.

Also preferably, a plurality of clamps 27 are provided. Each of the clamps is adapted for coupling a portion of the piping system to a cross member of the structure extending generally perpendicular the portion of the piping system. Ideally, each of the clamps is generally U-shaped and forms a channel, the associated portion of the piping system is positioned in the channel, the hook has an arcuate flange extending outwardly therefrom for positioning the associated portion of the piping system alongside and below the associated cross member. Each of the clamps should have a reinforcement portion 28 to prolong the life of the clamp by thickening the clamp, thereby requiring longer for the clamp to deteriorate and break due to corrosion.

Preferably, an outer periphery of the lower piping system is positioned about 4 feet from the walls of the base. Also preferably, an outer periphery of the upper piping system is positioned about 4 feet from roofing portions of the roof.

In an exemplary embodiment for a 40 foot by 20 foot base, the dimensions of the lower piping system would be about 32 feet long by about 12 feet wide.

In use, pesticide or insecticide is placed in the reservoir. The pumping system is turned on to spray the fog throughout the attic and crawlspace under the floor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An extermination system comprising:

a structure having a base and a roof;

a piping system;

said piping system having a plurality of nozzles positioned therealong, said nozzles being adapted for spraying a pesticide;

a pumping device in fluid communication with said piping system and adapted for pumping pesticide into said piping system; and wherein said piping system is positioned about 4 feet from a nearest wall of said structure;

a reservoir being in fluid communication with said piping system and adapted for storing pesticide;

a filter for filtering the pesticide;

a plurality of hooks each adapted for coupling a portion of said piping system to a cross member of a structure extending generally parallel said portion of said piping system;

wherein each of said hooks has an arcuate flange extending outwardly therefrom for positioning the associated portion of the piping system alongside and below the associated cross member;

a plurality of clamps each adapted for coupling a portion of said piping system to a cross member of said structure extending generally perpendicular said portion of said piping system;

wherein each of said clamps being generally U-shaped and forming a channel, the associated portion of said piping system being positioned in said channel, said hooks each having an arcuate flange extending outwardly therefrom for positioning the associated portion of the piping system alongside and below the associated cross member.

2. A structure with extermination system comprising, in combination:

a structure having a base including four walls and a roof having a pair of roofing portions oriented at angles to a ceiling of said structure;

an annular lower piping system positioned inwardly of said base;

an annular upper piping system positioned inwardly of said roofing portions and above said ceiling;

each of said piping systems having a plurality of nozzles positioned therealong, said nozzles being adapted for spraying a pesticide, said nozzles being positioned between about 5 feet and about 8 feet apart;

a pumping device in fluid communication with said piping systems and adapted for pumping pesticide into said piping systems, said pumping device comprising an air compressor for blowing a mixture of air and said pesticide through said piping systems and out of said nozzles to form a vapor such that said vapor is for providing greater coverage throughout said base and said roof;

an outer diameter of said pipes of said piping system being about 1 and ½ inches;

a reservoir in fluid communication with said piping systems and adapted for storing pesticide, said reservoir being positioned between said pumping device and said nozzles;

a filter for filtering the pesticide;

a plurality of hooks each adapted for coupling a portion of said piping system to a cross member of said structure extending generally parallel said portion of said piping system;

each of said hooks having an arcuate flange extending outwardly therefrom for positioning the associated portion of the piping system alongside and below the associated cross member, said flange of each of said hooks tapering towards a distal end of said flange such that said distal end of said flange facilitating prevention of said distal end from becoming entangled in clothing of a user;

each of said hooks having a protrusion extending outwardly along a longitudinal axis of a mounting hole through which a fastener extends, a plurality of clamps each adapted for coupling a portion of said piping system to a cross member of said structure extending generally perpendicular said portion of said piping system; and each of said clamps being generally U-shaped and forming a channel, the associated portion of said piping system being positioned in said channel, said hooks each having an arcuate flange extending outwardly therefrom for positioning the associated portion of the piping system alongside and below the associated cross member.

* * * * *